(12) United States Patent
Thomas et al.

(10) Patent No.: US 6,240,900 B1
(45) Date of Patent: Jun. 5, 2001

(54) INDIVIDUAL KNOCK THRESHOLD

(75) Inventors: Christopher P. Thomas, West Bloomfield; William D. Rotramel, Plymouth; Howard W. Krausman, Dexter; Gregory T. Weber, Commerce Township; Joseph C. Umloff, Casco, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/406,986

(22) Filed: Sep. 28, 1999

(51) Int. Cl.[7] ................................. F02P 5/152
(52) U.S. Cl. ................ 123/406.21; 123/406.58; 123/406.62; 123/406.33
(58) Field of Search ............... 123/406.21, 406.33, 123/406.58, 406.62

(56) References Cited

U.S. PATENT DOCUMENTS

| | | |
|---|---|---|
| 4,312,214 | 1/1982 | Kramer et al. . |
| 4,483,295 * | 11/1984 | Iida .................................. 123/406.21 |
| 4,527,525 | 7/1985 | Mauermann et al. . |
| 4,565,171 * | 1/1986 | Sugiura et al. .................. 123/406.21 |
| 4,574,758 | 3/1986 | Yagley . |
| 4,612,902 * | 9/1986 | Abe et al. ........................ 123/406.21 |
| 4,760,828 * | 8/1988 | Shimada et al. ................. 123/406.21 |
| 4,788,957 * | 12/1988 | Komurasaki ..................... 123/406.21 |
| 4,802,455 * | 2/1989 | Abo .................................. 123/406.21 |
| 4,821,697 | 4/1989 | McDougal . |
| 4,829,962 | 5/1989 | Häfner . |
| 5,038,735 * | 8/1991 | Hosoya et al. ................... 123/406.21 |
| 5,099,811 | 3/1992 | Frantz et al. . |
| 5,101,789 * | 4/1992 | Voigt et al. ...................... 123/406.21 |
| 5,133,322 | 7/1992 | McDougal et al. . |
| 5,144,929 * | 9/1992 | Hosoya et al. ................... 123/406.21 |
| 5,233,962 | 8/1993 | Fodale et al. . |
| 5,392,641 | 2/1995 | McCombie . |
| 5,406,921 | 4/1995 | Noble et al. . |
| 5,421,191 | 6/1995 | Pyko et al. . |
| 5,492,007 | 2/1996 | Noble et al. . |
| 5,526,788 | 6/1996 | Noble et al. . |
| 5,535,722 * | 7/1996 | Graessley et al. .............. 123/406.21 |
| 5,692,473 | 12/1997 | Thomas et al. . |
| 5,701,865 | 12/1997 | Thomas et al. . |
| 6,062,199 * | 5/2000 | Entenmann et al. ............ 123/406.21 |

* cited by examiner

Primary Examiner—Erick Solis
(74) Attorney, Agent, or Firm—Mark P. Calcaterra

(57) ABSTRACT

A method is provided for controlling knock in an internal combustion engine. The method utilizes an adaptive control scheme to tailor knock thresholds to the current engine operating conditions, as well as to identify the cylinder in which the knocking condition occurred. The method utilizes a modified spark advance to alter the spark timing for the engine cylinders if a knocking condition is detected and a predetermined set of conditions has been met.

12 Claims, 9 Drawing Sheets

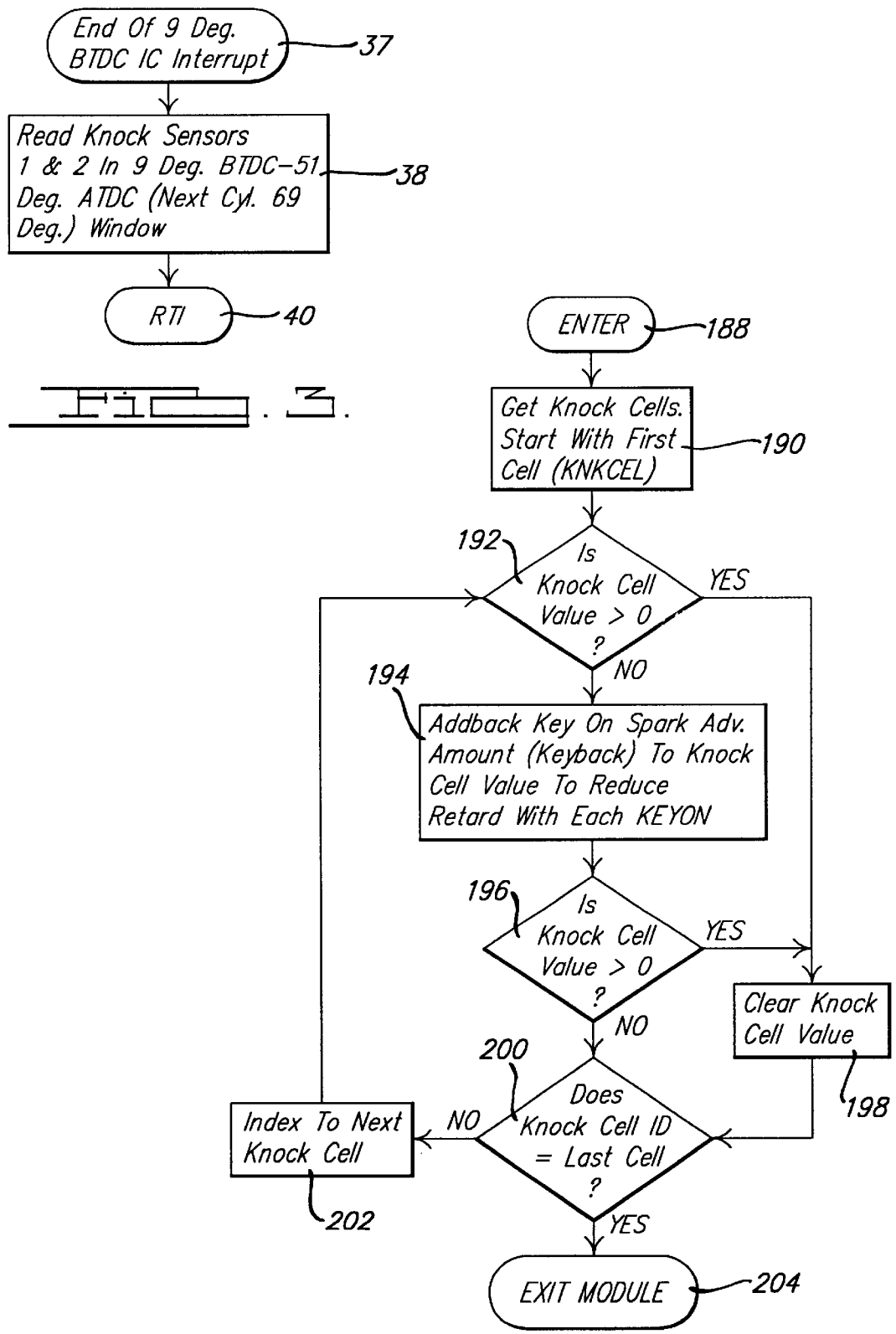

INDIVIDUAL KNOCK THRESHOLD

BACKGROUND OF THE INVENTION

1. Technical Field

The present invention relates generally to a knock strategy for an internal combustion engine and more particularly to a knock strategy which detects engine knock on an individual cylinder basis.

2. Discussion

A conventional four-cycle internal combustion engine typically includes at least four pistons located within corresponding piston cylinders. Each of these pistons has four associated strokes during the engine combustion cycle: a fuel intake stroke, a fuel compression stroke, an expansion stroke in which the piston rotates the engine crankshaft, and an exhaust stroke in which the burned gas and associated byproducts are exhausted from the cylinder. At some point subsequent to the piston intake stroke and prior to the piston reaching top dead center (TDC) on the compression stroke, a spark plug associated with the cylinder fires a spark to initiate the combustion that drives the piston in its expansion stroke. The spark advance, or timing, of the spark determines the phasing of the burn for the fuel/air mixture in the cylinder, and thus directly affects engine performance.

The above-mentioned combination of load, spark advance and fuel/air mixture determines the temperature of the residual, which is the burned gas that is retained in the cylinder. Hence, the temperature of the residual gas thereby directly affects subsequent combustion events and the occurrence of knock. Ideally, the combustion of the fuel/air mixture within the cylinder is caused by a uniform flame front that progresses across the cylinder over a finite period of time. However, depending upon the temperature of the residual gas, engine load and ratio of fuel in the fuel/air mixture, the flame front within a cylinder may progress in a non-uniform manner, causing the gases within the cylinder to expand through several localized explosions, collectively known as knock, rather than in one uniform and sustained explosion. The localized explosions cause the pressure of the gases within the cylinder to oscillate, sending vibrations through the cylinder block, piston, connecting rod and crankshaft.

As is known in the art, a "well placed" sensor which is tuned to the correct frequency so as to maximize the signal-to-noise ratio can be placed in the engine to sense the vibrations created by knock. However, the inherent flaw of the "well-placed" sensor strategy is that the magnitude of the vibrations sensed by the sensor vary as a function of the distance from the cylinder which is generating the vibrations (i.e., knocking). Therefore, assuming knock is occurring in two cylinders at an equivalent magnitude and that the sensor is closer to one of these cylinders than the other, the sensor will detect two levels of vibration: a higher magnitude series of vibrations from the cylinder closest the sensor and a lower magnitude series of vibrations from the more distant cylinder.

Several strategies have been developed which employ a "well-placed" sensor and a single threshold vibration level to detect the occurrence of knock in any of the engine cylinders (i.e., globally). Typically, this threshold vibration level coincides with a knocking condition in the cylinder furthest the sensor. Consequently, cylinders closer to the sensor which are creating vibrations but not suffering from a knocking condition could inadvertently cause premature deployment of a knock control method. Deployment of these knock control methods immediately reduces the temperature in the cylinders by reducing the temperature of the residual. In accomplishing this reduction in temperature, the knock control methods must naturally effect the efficiency with which the fuel/air mixture combusts. Therefore, premature detection of knocking unnecessarily effects fuel economy in an adverse manner.

Other variations have been developed in an effort to overcome the problems associated with global monitoring with a single "well-placed" sensor. One alternative has been to tailor the knock detection strategy to the vibrations of a single cylinder which has been statistically determined through empirical testing to be more prone to knock than the other cylinders. While this strategy has been employed with favorable results, recent improvements in the delivery of air and fuel to the individual engine cylinders have created engines with very little cylinder-to-cylinder variation. Consequently, these improvements have eliminated the ability to reliably use any one cylinder as an indicator of whether knock is occurring in an engine. Stated another way, while an individual engine may have a specific cylinder which is more prone to knock, the location of this cylinder varies from engine to engine and as such, no one location can produce reliable results under this method.

Another strategy that has been developed employs a "well placed" sensor to globally monitor vibrations, identify a cylinder which is experiencing a knocking condition and direct any knock control activities to the cylinder experiencing knock, exclusively. While this type of strategy provides the best capabilities to detect and control knock while minimizing the adverse effects on fuel economy, there are several significant drawbacks to this strategy. One such drawback is the requirement to precisely control fuel and air at each individual cylinder. This requirement often requires additional controls equipment and software, as well as complicating the assembly and servicing of the engine. For example, where an engine manufacturer employs recirculated exhaust gases to reduce the amount of oxygen in the intake air, several control valves corresponding to each specific cylinder must be incorporated into the intake manifold ports. These per-cylinder valves ensure precise control of the air mixture flowing into the knocking cylinder as well as prevent recirculated exhaust gases from being directed to an adjacent non-knocking cylinder. Naturally, the costs associated with the substantial addition of controls equipment is quite significant, both in terms of direct costs (e.g., piece costs, assembly labor) and indirect costs (e.g., warranty, ability to service the engine).

Consequently, there remains a need in the art for an improved knock strategy which globally detects knock and provides the capability to control knock in a cost-effective manner.

SUMMARY OF THE INVENTION

It is therefore one object of the present invention to provide an improved knock strategy for an internal combustion engine.

It is a more specific object of the present invention to detect a knocking condition in each of the cylinders of an internal combustion engine by sensing vibrations, identifying the cylinder which is producing the vibrations and determining whether that cylinder is experiencing a knocking condition.

It is a further object of the present invention to implement a knock control method when knock in an individual cylinder has been detected.

The method of the present invention utilizes one or more "well placed" sensors to globally monitor the vibrations transmitted from the engine pistons and cylinders. When vibrations over a predetermined threshold are sensed, an engine control unit determines which cylinder which produced the vibrations and whether that cylinder is experiencing a knocking condition. Once a knocking condition is identified, knock control is employed to eliminate the knocking condition. Preferably, knock control is effected globally through a modification to the spark advance used to control combustion in each of the engine cylinders. This method provides accurate determination of a knocking condition as well as cost-effective control of knock. Alternatively, knock control may be effected on a per-cylinder basis through a modification to the spark advance used to control combustion in the particular cylinder determined be knocking.

Additional advantages and features of the present invention will become apparent from the subsequent description and the appended claims, taken in conjunction with the accompanying drawings.

BRIEF DESCRIPTION OF THE DRAWINGS

FIG. 3 is a flowchart of a knock sensor read subroutine for the knock strategy of FIG. 2;

FIG. 5 is a flowchart of a non-diagnostic subroutine for the knock strategy of FIG. 2.

DETAILED DESCRIPTION OF THE PREFERRED EMBODIMENT

Figure 1:
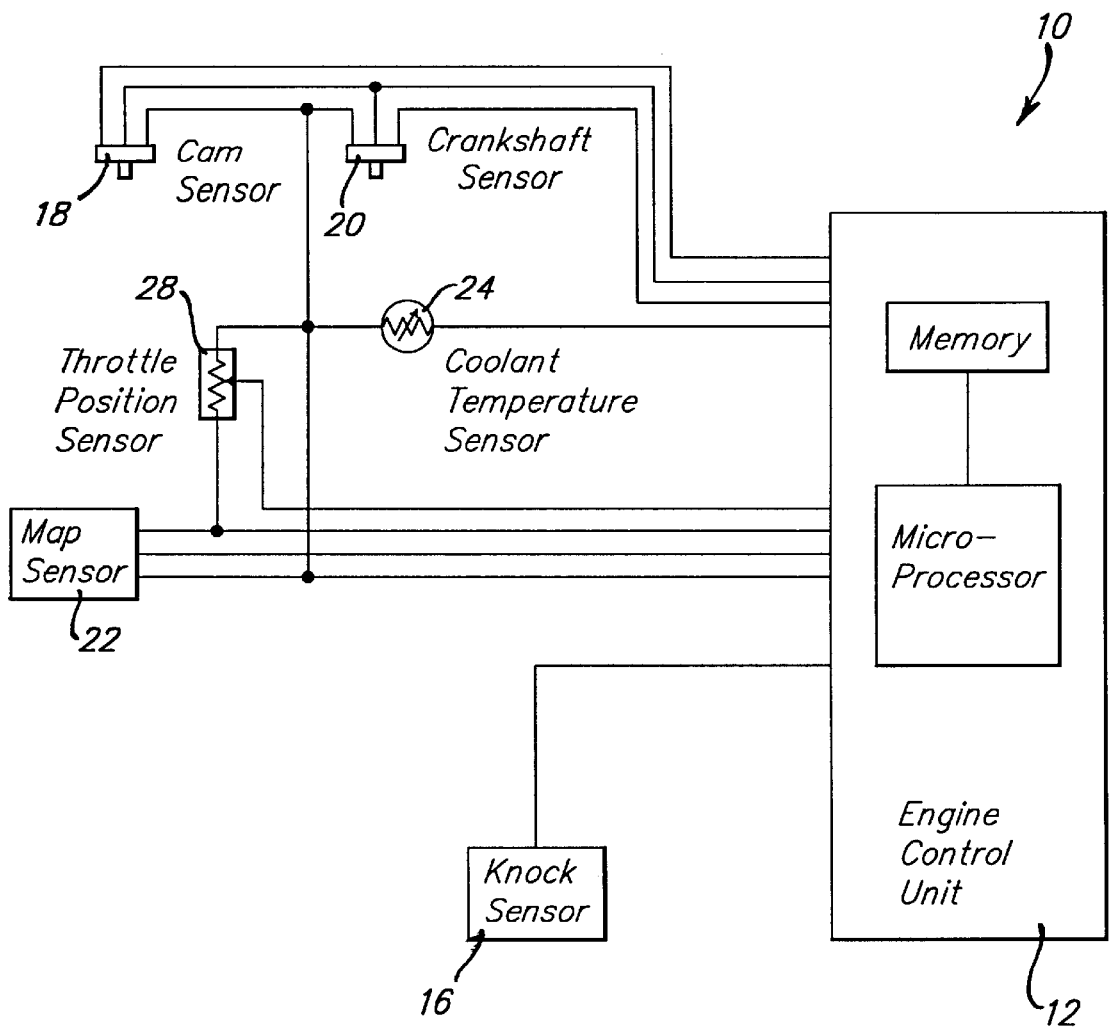
FIG. 1 is an overall schematic view of a hardware diagram for a knock strategy according to the present invention.

Referring to FIG. 1, an exemplary knock detection and control system for an internal combustion engine is designated by reference numeral 10. Knock system 10 includes an engine control unit (ECU) 12, a knock sensor 16, a camshaft position sensor 18, a crankshaft position sensor 20, a manifold absolute pressure (MAP) sensor 22, a coolant temperature sensor 24 and a throttle position sensor 28. ECU 12 includes a microprocessor, memory, (address, control and data) bus lines and other hardware and software to perform tasks of engine control. Knock sensor 16 is operable sensing the combustion condition within each of the engine cylinders and producing an output signal indicative of the combustion condition within the cylinders. In the particular embodiment illustrated, knock sensor 16 senses vibrations within a predetermined frequency range and produces an output signal which varies according to the strength of the vibrations sensed. The output signal produced by knock sensor 16 is transmitted to ECU 12. Camshaft position sensor 18 and crankshaft position sensor 20 are connected to ECU 12 and allow ECU 12 to determine the rotational position and speed of the engine. MAP sensor 22, throttle position sensor 28 and coolant temperature sensor 24 are connected to ECU 12 and are operable for sensing the manifold absolute pressure, throttle position and coolant temperature, respectively. It should be appreciated that knock system 10 may include other hardware not described for carrying out or performing the knock strategy or methodology to be described.

Referring to FIGS. 2A–C and 3, a knock strategy or methodology, according to the present invention, is shown. The knock methodology includes five sections: 1) knock sensor read; 2) adaptive background noise updating; 3) short term spark retard under knock conditions; 4) long term spark retard under persistent engine knocking; and 5) long term (high octane) spark advance under extended periods of no knock engine operation. The functioning of each section is described below.

In FIG. 3, the knock sensor read methodology is entered at bubble 37 at the end of the 9-degree before top dead center (TDC) IC interrupt. The knock sensor read methodology advances to block 38 and samples the knock sensor 16 from the 9-degree before TDC to the 51-degree after TDC positions (next 69-degree edge). The knock sensor 16 is operable for sensing acceleration in a certain frequency range and generating a signal of an appropriate voltage which is received by ECU 12. The knock sensor read methodology evaluates the signal generated by knock sensor 16 in the window around each cylinder's ignition event. The knock sensor read methodology then returns through bubble 40 to block 42 of the knock methodology in FIG. 2A.

Figure 2A:
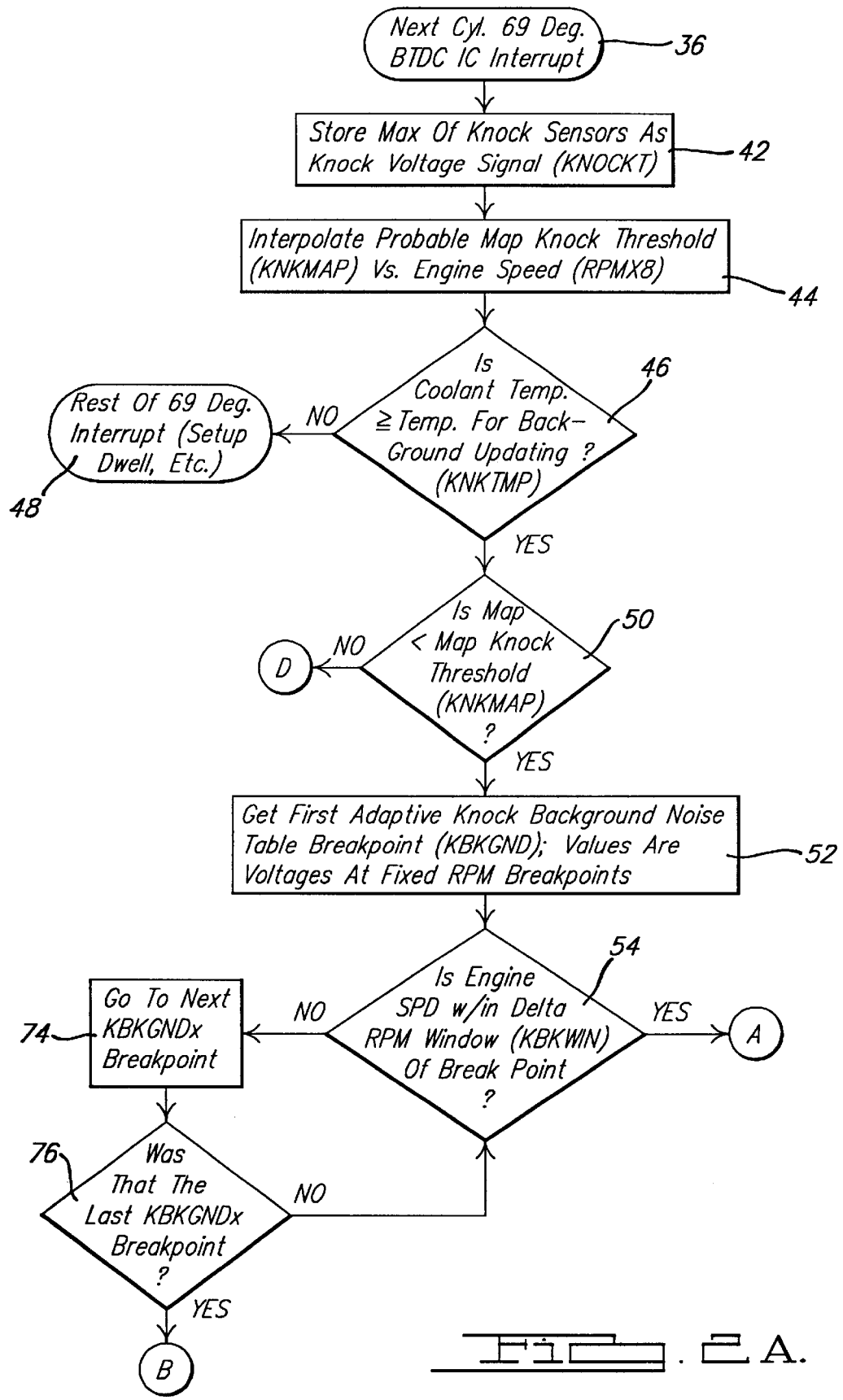
FIGS. 2A through C are flowcharts detailing the knock strategy of the present invention.
Figure 2B:
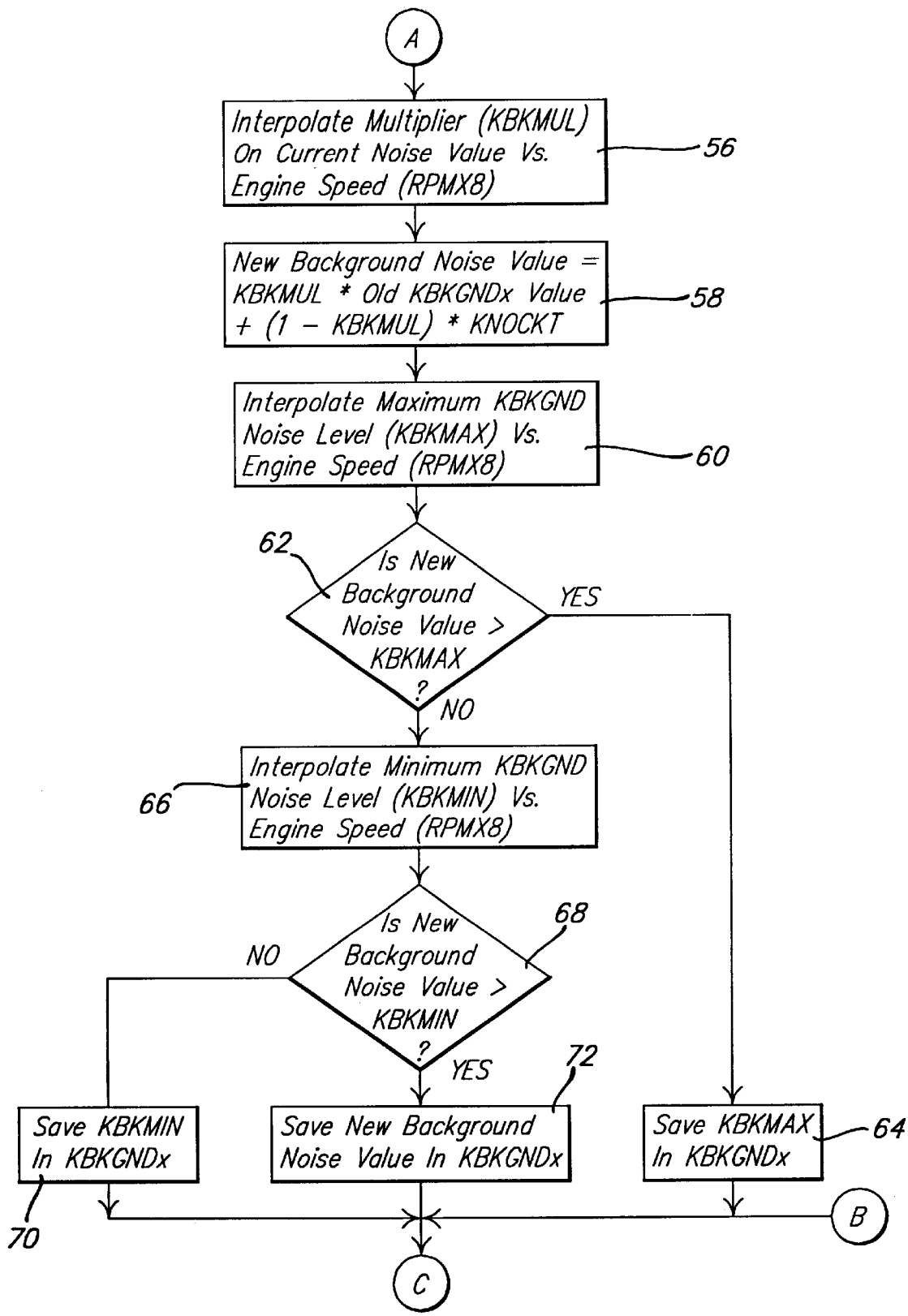

Referring now to block 42 in FIG. 2A, the methodology determines the maximum voltage (KNOCKT) of the signal generated by knock sensor 16 and stores this value in memory. From block 42, the knock methodology advances to block 44 and interpolates a probable map knock threshold (KNKMAP) versus the engine rotational speed (PRM×8). The crankshaft sensor 20 senses the speed of the engine and sends an appropriate signal to ECU 12. The interpolation is performed on a table stored in memory of KNKMAP versus RPM×8. The knock methodology then advances to decision block 46 to begin adaptive background noise updating.

During adaptive background noise updating, the methodology computes a running composite average of the knock sensor voltages generated during conditions of low knock probability (e.g., low speed, low load conditions). The average represents the level of "background noise" that must be exceeded by the signal produced by knock sensor 16 in order to be classified as knock. In decision block 46, the methodology determines whether the engine coolant temperature (CLTEMP) is greater than or equal to a predetermined temperature for background updating (KNKTMP). This is accomplished by the coolant temperature sensor 24 providing a signal to ECU 12 corresponding to the temperature of the engine coolant. KNKTMP has a predetermined value stored in memory of ECU 12 and corresponds to a temperature indicating that the engine has sufficiently warmed up. If CLTEMP is not greater than or equal to KNKTMP, the methodology advances to bubble 48 where the methodology ignores adaptive background noise updating and sets up dwell, etc. with an unmodified spark advance.

Referring back to decision block 46, if CLTEMP is greater than or equal to KNKTMP, the knock methodology advances to decision block 50 and determines whether MAP is less than the MAP knock threshold (KNKMAP) previously interpolated in block 44. MAP sensor 22 is operable for providing a signal to ECU 12 indicative of the MAP. If MAP is less than a MAP knock threshold, the methodology advances to block 52 and gets a first adaptive knock background noise table (KBKGND) breakpoint. The breakpoint values are knock sensor voltages at fixed engine speed breakpoints in a table (KBKBGD) of MAP versus engine speed (RPM×8) stored in the memory of ECU 12. The methodology then advances to decision block 54.

In decision block 54, the methodology determines whether the engine speed (RPM×8) is within a predetermined delta RPM window (KBKWIN) of the breakpoint (KBKGNDx). The methodology uses RPM×8 to index into and sequentially search through KBKGNDx locations. The methodology selects KBKGNDx if RPM×8 is within KBK-WIN of that location's RPM breakpoint. If an appropriate KBKGNDx is found, the methodology advances to block 56 and interpolates a multiplier (KBKMUL) on current background noise value (KBKGND) versus engine speed (RPM× 8). This interpolation is performed on a table of KBKMUL versus RPM×8 stored in the memory of ECU 12. The multiplier allows different weighing of the previous knock sensor voltage value versus a new knock sensor voltage value based on RPM×8.

From block 56, the methodology advances to block 58 and calculates a new KBKGND value equal according to the formula, below.

$$KBKGND=(KBKMUL \times previous\ KBKGNDx)+[(1-KBKMUL) \times KNOCKT]$$

The methodology then advances to block 60 and checks the new KBKGND value against a maximum background noise value (KBKMAX). The methodology interpolates KBKGND based on a table of maximum background noise value (KBKMAX) versus engine rotational speed (RPM×8). The methodology then advances to decision block 62 and determines whether the new background noise value is greater than KBKMAX. If so, the methodology advances to block 64 and saves KBKMAX as KBKGNDx.

In decision block 62, if the new KBKGND value is not greater than KBKMAX, the methodology advances to block 66 and checks the new KBKGND value against a minimum background noise value (KBKMIN). The methodology interpolates KBKGND based on a table of minimum background noise vale (KBKMIN) versus engine rotational speed (RPM×8). The methodology then advances to decision block 68 and determines whether the new KBKGND value is greater than KBKMIN. If not, the methodology advances to block 70 and saves KBKMIN as KBKGNDX. If the new KBKGND value is greater than KBKMIN, the methodology advances to block 72 and saves the new KBKGND value as KBKGNDX. Once background updating is completed, the methodology branches to the short-term retard section to be described.

Referring back to decision block 54, if RPM×8 is not within KBKWIN, the methodology advances to block 74 and goes to the next KBKGNDx breakpoint. The methodology then advances to decision block 76 and determines whether that was the last KBKGNDx breakpoint. If not, the knock methodology loops back to decision block 54. If so, the knock methodology abandons background updating and branches to the short-term retard section to be described.

Figure 2C:
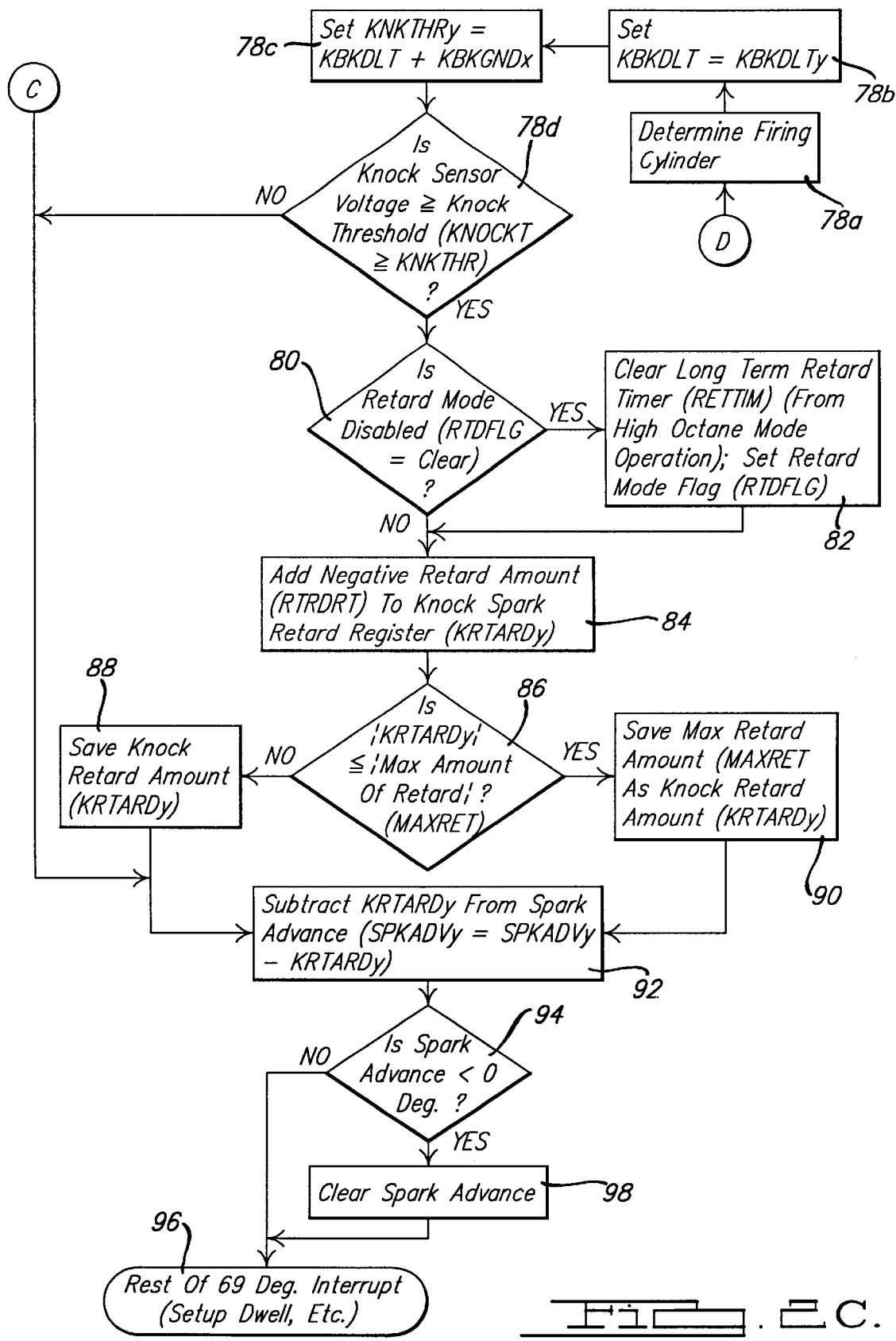

Referring back to decision block 50, if MAP is not less than KNKMAP, the methodology advances to block 78a to begin short term spark retard in FIG. 2C. During short-term spark retard, the methodology immediately stops engine knock in a given cylinder after it occurs. When sufficient knock sensor activity is detected, the methodology retards the spark advance from its normal value for the next ignition event for that cylinder. However, the methodology removes the retard quickly after knock ceases to avoid lowering engine efficiency for too long.

In block 78a the methodology identifies the particular cylinder (CYLy) which is firing. This step is accomplished by correlating the signals produced by camshaft and crankshaft sensors 18 and 20, respectively, to determine the rotational position of the engine to thereby identify CYLy. The methodology then advances to block 78b where a delta knock sensor signal value (KBKDLT) is set equal to a predetermined delta value (KBKDLTy) for CYLy. It should be appreciated that the value of KBKDLTy will vary from cylinder to cylinder based upon a number of factors, distance between the cylinder and knock sensor 16, the geometry of the engine, etc. The methodology advances next to block 78c where the knock threshold (KNKTHRy) for a given cylinder is set equal to KBKDLT added to KBKGNDx. The methodology then advances to decision block 78d.

In decision block 78d, the methodology determines whether the knock sensor voltage (KNOCKT) from block 42 is greater than or equal to KNKTHRy. If KNOCKT is greater than or equal to KNKTHRy, the methodology proceeds to decision block 80 and determines whether the retard mode is disabled (RTDFLG=clear). If so, the methodology advances to block 82 and clears the long term retard timer (RETTIM) to discontinue high octane mode operation and then sets the retard mode flag (RTDFLG) to prepare for long term spark retard.

After block 82 is completed or the retard mode is not disabled in decision block 80, the methodology advances to block 84 and increases a knock retard (KRTARDy) amount by adding a negative retard rate or amount (RTRDRT) to KRTARDy. In the preferred embodiment, KRTARDy is applied to uniformly affect the spark advance of all cylinders to thereby control engine knock on a global basis. However, it will be understood that the scope of the present invention includes the use of KRTARDy to control the spark advance associated with a particular cylinder (i.e., CYLy) to control engine knock on a per-cylinder basis. The methodology then advances to decision block 86 and determines whether the absolute value of KRTARDy is less than or equal to the absolute value of a maximum amount of retard (MAXRET). MAXRET is calculated in the spark advance section to be described. If not, the methodology advances to block 88 and saves KRTARDy. If so, the methodology advances to block 90 and saves MAXRET as KRTARDy.

Referring back to decision block 78d, if KNOCKT is not greater than or equal to KNKTHRy, the methodology advances to block 92 to be described. It should be appreciated that the methodology also advances from decision block 76 of FIG. 2A, blocks 64, 70, 72 of FIG. 2B and blocks 88 and 90 of FIG. 2C to block 92 to be described.

In block 92, the methodology subtracts the current KRTARDy from the spark advance (SPKADVy) for CYLy and leaves KRTARDy unchanged to set up the ignition timing. As previously mentioned, the method according to the preferred embodiment contemplates that SPKADVy would be implemented uniformly to each cylinder to control engine knock on a global basis. However, it is within the scope of the present invention that SPKADVy be used to control engine knock on a per-cylinder basis. The methodology then advances to decision block 94 and determines whether SPKADVy is less than zero degrees. If not, the methodology advances to bubble 96 and sets up dwell, etc. similar to bubble 48 described previously. If SPKADVy is less than the predetermined value, the methodology advances to block 98 and clears SPKADVy and advances to bubble 96 previously described.

Figure 4A:
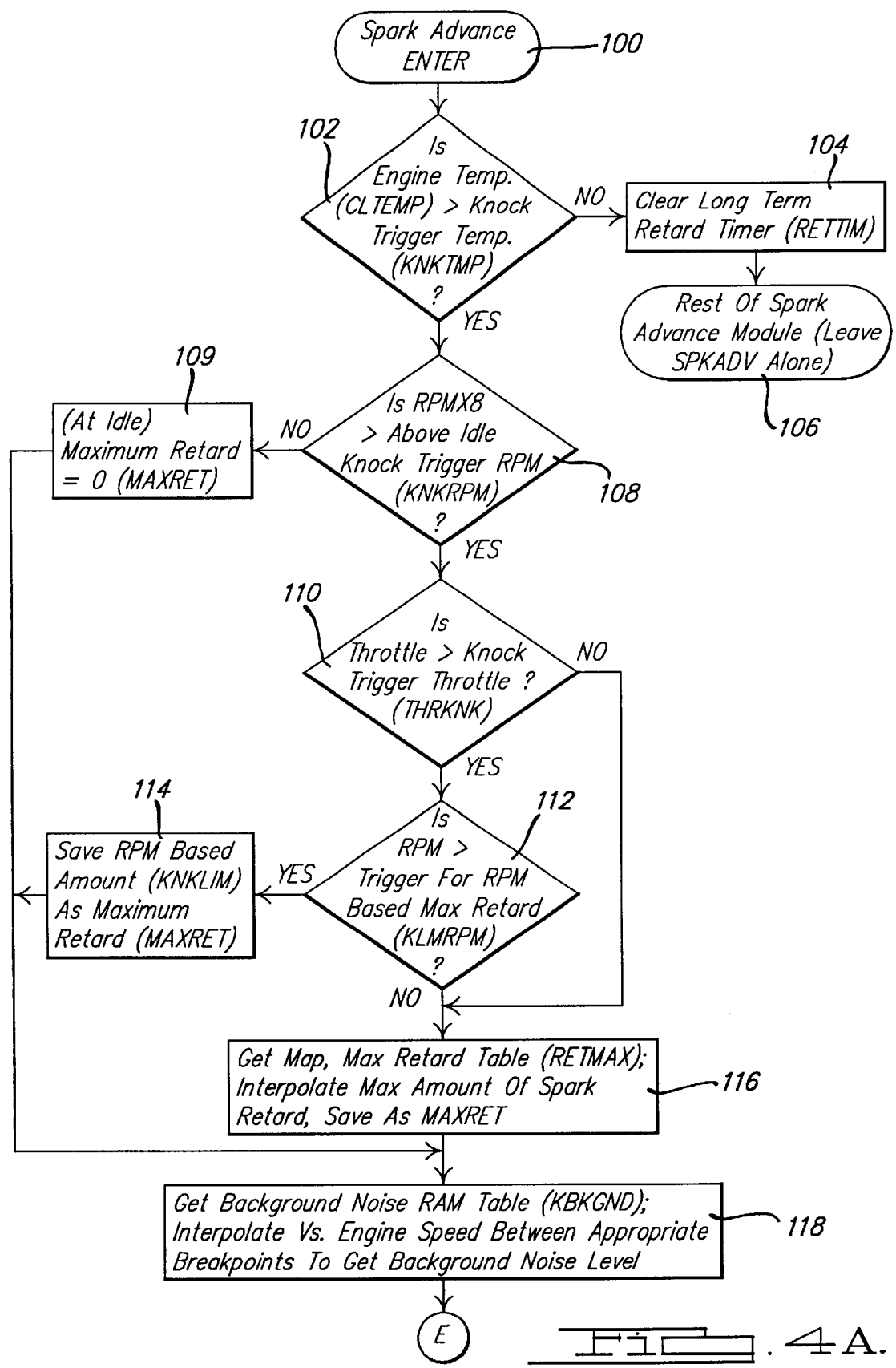
FIGS. 4A through D are flowcharts of a spark advance subroutine for the knock strategy of FIG. 2.
Figure 4B:
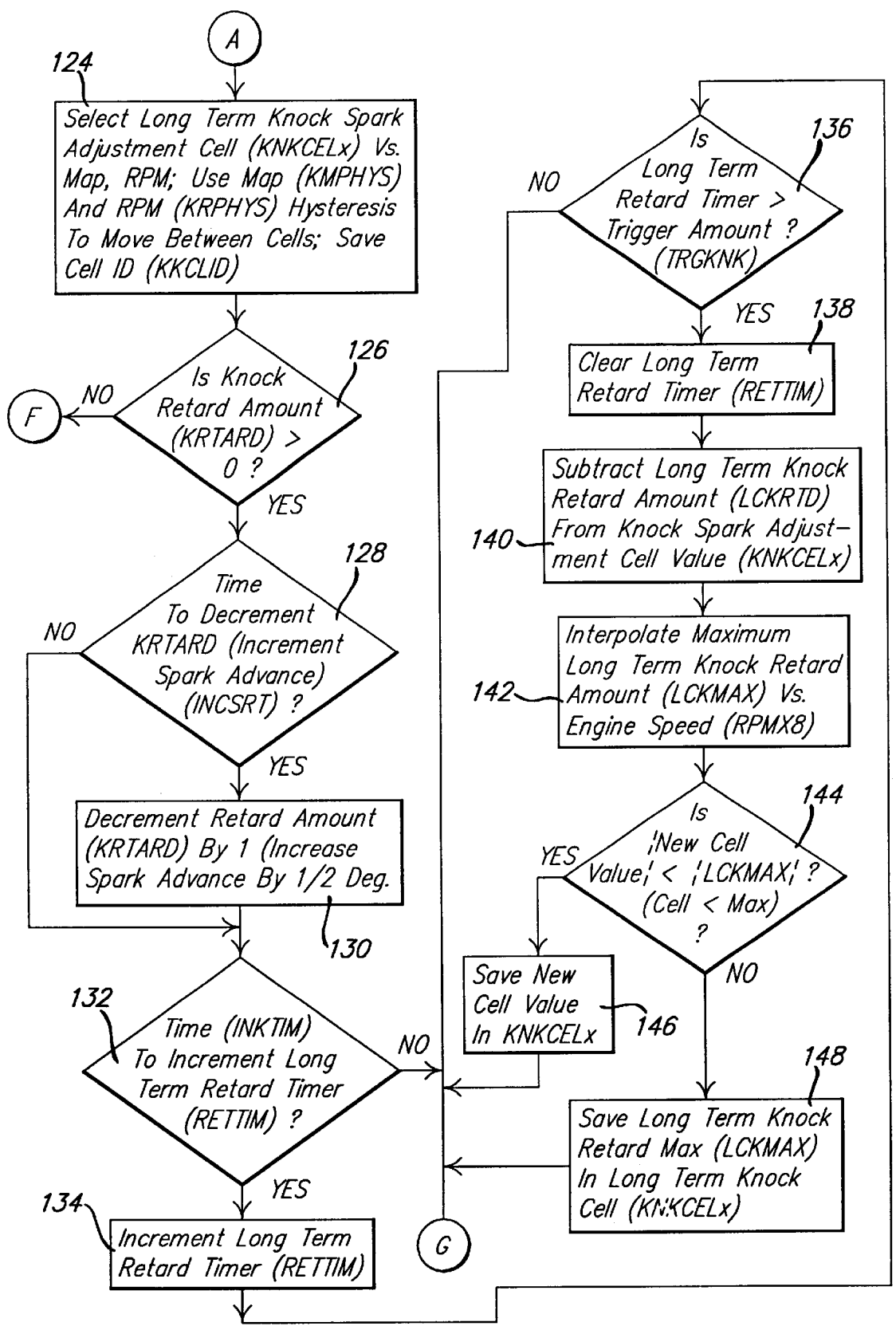
Figure 4C:
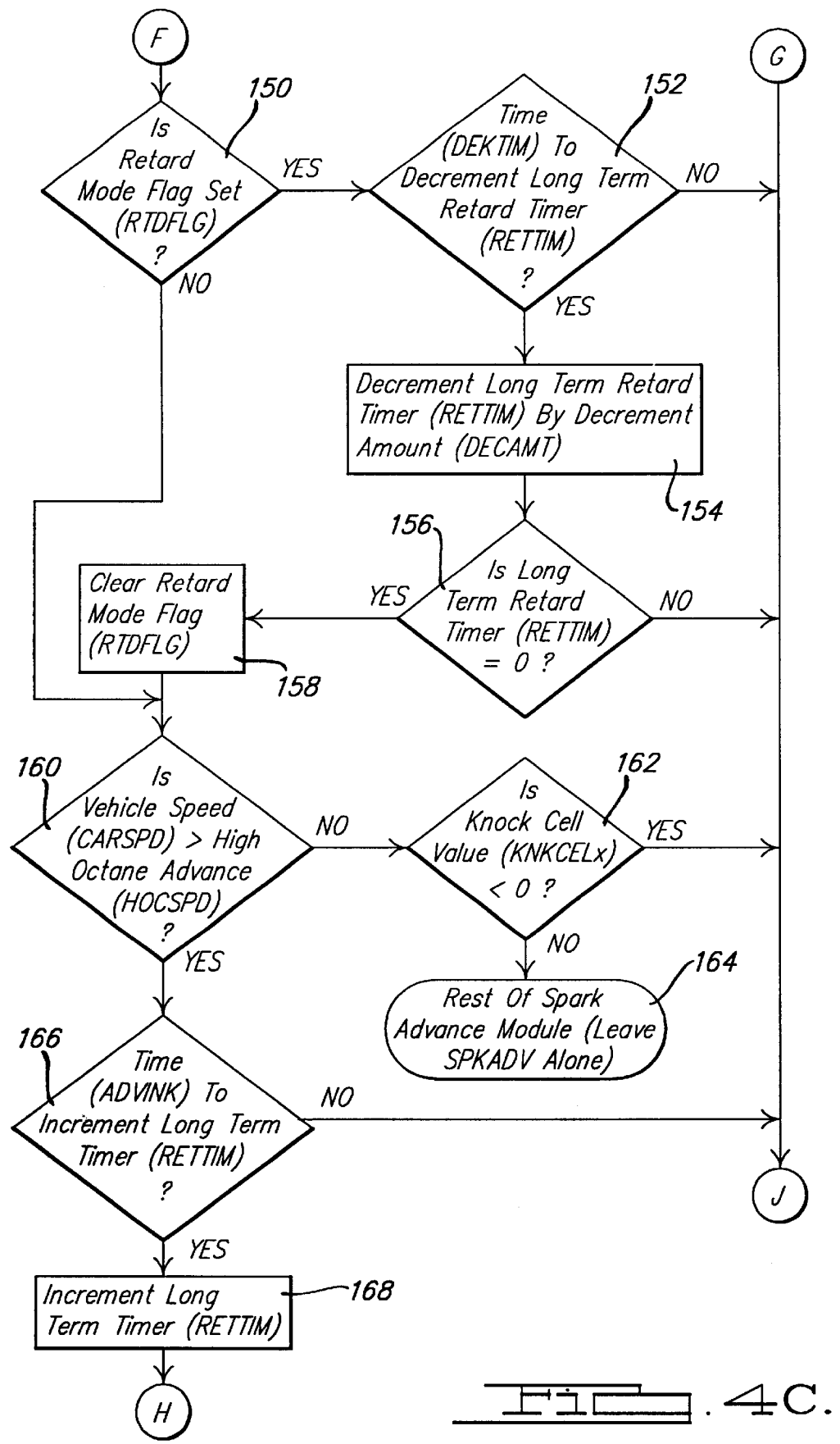

Referring to FIGS. 4A through 4C, a methodology for the spark advance subroutine is shown. After bubbles 48 and 96, the spark advance methodology enters through bubble 100 and advances to decision block 102. In decision block 102, the methodology determines whether the engine temperature (CLTEMP) is greater than the predetermined temperature for background updating (KNKTMP). If not, the methodology advances to block 104 and clears the long-term retard timer (RETTIM). The methodology then advances to bubble 106 to leave spark advance unmodified by knock.

In decision block 102, if CLTEMP is greater than KNKTMP, the methodology advances to decision block 108 and determines whether the engine rotational speed (RPM×8) is greater than an idle knock trigger speed (KNKRPM). KNKRPM has a predetermined value corresponding to a low speed stored in memory of ECU 12. If RPM×8 is not greater than KNKRPM, the methodology advances to block 109 and sets the maximum retard (MAXRET) equal to a predetermined value such as zero (0). If RPM×8 is greater than KNKRPM, the methodology advances to block 110 and determines whether the throttle is greater than a knock trigger throttle (THRKNK). The throttle position sensor 28 senses the position of the throttle and provides ECU 12 with an appropriate signal indicative of its position. THRKNK has a predetermined value corresponding to a high throttle position stored in the memory of ECU 12. If the throttle is greater than THRKNK, the methodology advances to decision block 112 and determines whether RPM×8 is greater than a knock limit RPM (KLMRPM). If so, the methodology advances to block 114 and saves the rpm based amount (KNKLIM) as the maximum retard (MAXRET).

If the throttle is not greater than THRKNK in decision block 110 or if RPM×8 is not greater than KLMRPM in decision block 112, the methodology advances to block 116 where the methodology gets a MAP value from the MAP sensor 22 and interpolates MAXRET versus MAP in a table stored in the memory of ECU 12. The methodology saves the interpolated value as MAXRET.

From blocks 110, 114 and 116, the methodology advances to block 118 where the methodology gets the background noise table (KBKGND) and interpolates engine speed (RPM×8) between appropriate breakpoints (KBKGNDx) to get the corresponding background noise KBKGND value. The methodology then advances to block 124 in FIG. 4B.

Prior to the long term retard and high-octane spark advance sections, the methodology selects one of a matrix of 10 (RAM) knock cells (KNKCELx) for use therein. In block 124, the methodology selects the long-term knock spark adjustment cell (KNKCELx) based on a table of MAP versus engine rotational speed. Moving out of one cell into another requires exceeding a MAP hysteresis (KRHYS) and an engine rotational speed hysteresis (KRPHYS). If the combination of MAP and RPM×8 is below the lowest KNKCELx, the methodology ignores the long-term retard and spark advance sections and branches to save the unmodified spark advance. If MAP and RPM×8 are above the highest KNKCELx, the methodology uses that cell and saves the cell ID as (KKCLID). The methodology then advances to decision block 126.

In decision block 126, the methodology determines whether the knock retard (KRTARDy) amount is greater than a predetermined value such as zero (0). If so, the methodology advances to decision block 128 and determines whether its is time to decrement KRTARDy once each increment spark advance (INCSRT) amount of time passes. If so, the methodology advances to block 130 and decrements the KRTARDy by a predetermined value such as one (1). Once this is completed, or if it is not time to decrement KRTARDy, the methodology leaves KRTARDy alone and advances to perform long term spark retard in decision block 132. The long-term spark retard subtracts a large negative spark advance (retard) from the selected KNKCELx if shortterm retard is active for a specific length of time.

In decision block 132, the methodology determines whether it is time to increment the long-term retard timer (RETTIM). If so, the methodology advances to block 134 and increments RETTIM every time an increment amount of time (INKTIM) passes. The methodology then advances to decision block 136 and determines whether RETTIM is greater than a predetermined long-term trigger amount (TRGKNK). If so, the methodology advances to block 138 and clears the RETTIM. The methodology then advances to block 140 and subtracts a long-term knock retard amount (LCKRTD) from the knock spark adjustment cell value (KNKCELx). The methodology then advances to block 142 and checks the new KNKCELx value against an interpolated maximum long term knock retard amount (LGKMAX) versus engine speed (RPM×8). The methodology then advances to decision block 144 and determines whether the absolute value of the new KNKCELx is less than the absolute value of LGKMAX. If so, the methodology advances to block 146 and saves the new value of KNKCELx in KNKCELx. If not, the methodology advances to block 148 and saves LGKMAX in KNKCELx.

Referring back to decision block 126, if KRTARDy is not greater than the predetermined value such as zero (0), the methodology advances to perform high octane spark advance in decision block 150. The high octane spark advance increases the long term knock cells under highway cruise conditions as long as the knock control system 10 senses no knock activity.

In decision block 150, the methodology determines whether the retard mode flag is set (RTDFLG). If so, the methodology advances to decision block 152 and determines whether it is time (DEKTIM) to decrement the long term retard timer (RETTIM). If so, the methodology advances to block 154 and decrements the long term retard timer (RETTIM) by a decrement amount (DECAMT) every time a DEKTIM amount of time elapses. The methodology advances to decision block 156 and determines whether RETTIM is equal to a predetermined value, such as zero (0). If so, the methodology advances to block 158 and clears the retard mode flag (RTDFLG), thereby allowing RETTIM to be used for high octane spark advance.

After block 158 is completed or if the RTDFLG flag has not been set, the methodology advances to decision block 160 and determines whether the vehicle speed (CARSPD) is greater than a high octane advance speed (HOCSPD). HOCSPD has a predetermined value corresponding to a highway speed for allowing long term advance. If not, the methodology advances to decision block 162 and determines whether KNKCELx is less than zero (0), indicating that long term knock retard is still operable. If not, the methodology advances to bubble 164 to leave spark advance unmodified by knock.

Figure 4D:
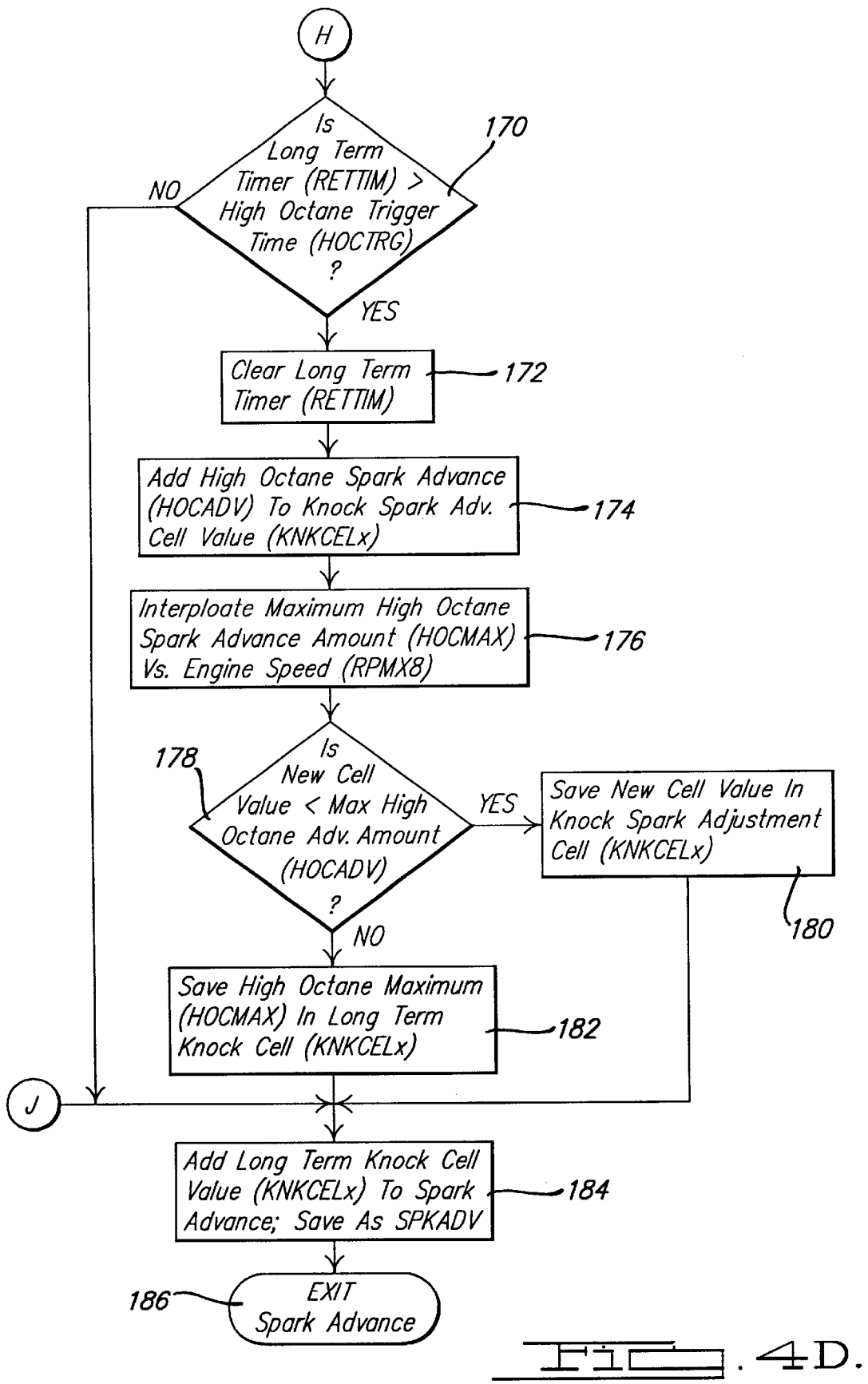

In decision block 160, if CARSPD is greater than HOCSPD, the methodology advances to decision block 166 and determines whether it is time to increment RETTIM. If so, the methodology advances to block 168 and increments RETTIM every time an advance increment (ADVINK) amount of time passes. The methodology then advances to decision block 170 in FIG. 4D and determines whether RETTIM is greater than the high-octane trigger amount (HOCTRG). If so, the methodology advances to block 172 and clears RETTIM. The methodology then advances to block 174 and adds the high-octane spark advance (HOCADV) to knock spark advance cell value (KNKCELx). The methodology then advances to block 176 and checks the new KNKCELx value against an interpolated maximum high octane spark advance amount (HOCMAX) versus engine rotational speed (RPM×8). The methodology then advances to decision block 178 and determines whether the new KNKCELx value is less than the maximum high-octane advance amount (HOCAVD). If so, the methodology advances to block 180 and saves the new KNKCELx value in knock spark adjustment cell (KNKCELx). If not, the methodology advances to block 182 and saves a high-octane maximum (HOCMAX) in long term knock cell (KNKCELx). From blocks 180 and 182, the methodology advances to block 184. It should be appreciated that the methodology also advances from blocks 136, 146, 148, and 132 of FIG. 4B, and blocks 152, 156 and 162 of FIG. 4C to block 184 of FIG. 4D. In block 184, the methodology adds the value in KNKCELx to the spark advance (SPKADV). The methodology then exits through bubble 186.

Referring to FIG. 5, the knock methodology includes a non-diagnostic subroutine. This subroutine eliminates high-octane spark advance and reduces long term retard at the start of each drive trip because environmental conditions, including barometric pressure, have likely changed. The methodology enters through bubble 188 and advances to block 190 to index once through the long term KNKCEL matrix to either clear out an advanced cell or remove some of a retard cell. In block 190, the methodology gets the knock cells and starts with the first knock cell (KNKCELx). The methodology advances to decision block 192 and determines whether the KNKCELx value is greater than zero (0), indicating that the spark timing has been advanced. If not, the methodology advances to block 194 and adds back spark advance (KEYBACK) to KNKCELx to reduce retard with each KEYON. The methodology then advances to decision block 196 and determines whether the KNKCELx value is greater than a predetermined value, such as zero (0). If so, or if the KNKCELx value is greater than zero in decision block 192, the methodology advances to block 198 and clears the KNKCELx value to zero (0).

After block 198 is completed or if the KNKCELx value is not greater than zero (0) in decision block 196, the methodology advances to decision block 200 and determines whether the knock cell ID is the last KNKCELx. If not, the methodology advances to block 202 and indexes to the next KNKCELx. The methodology then loops back to decision block 192. If the knock cell ID is the last KNKCELx in decision block 200, the methodology exits through bubble 204.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In a vehicle having an internal combustion engine, an electronic control module with memory, a plurality of sensors for generating signals in response to various vehicle dynamics, said engine including a plurality of engine cylinders, said electronic control module receiving said signals from said plurality of sensors and controlling said engine in response thereto, said plurality of sensors including a knock sensor and a position sensor, said knock sensor operable for generating a knock sensor signal indicative of a firing condition in each of said plurality of engine cylinders, said position sensor operable for generating a position sensor signal indicative of a rotational position of said engine, a method for controlling knock in said engine comprising the steps:

sensing a plurality of engine conditions, the plurality of engine conditions including an engine rotational speed, an engine temperature and a manifold absolute pressure;

determining whether said engine temperature is greater than a predetermined temperature;

determining a maximum value of said knock sensor signal;

identifying a particular cylinder which produced said maximum value;

employing the engine rotational speed and a look-up table having a plurality of predetermined background noise values to determine an average level of background noise transmitted through said engine;

determining a knock threshold for said particular cylinder, the knock threshold being determined from the average level of background noise and a predetermined amount based on an identity of the particular cylinder that produced the maximum value;

determining if said maximum value exceeds said knock threshold;

modifying a spark advance of only the particular cylinder that produced the maximum value if said maximum value exceeds said knock threshold, said engine temperature is greater than said predetermined temperature and said manifold absolute pressure is greater than a predetermined manifold absolute pressure; and otherwise, retarding said spark advance if said manifold absolute pressure is not less than said predetermined manifold absolute pressure and said engine temperature is greater than said predetermined temperature.

2. The method of claim 1 wherein said step of determining a maximum value comprises sampling said knock sensor signal in a predetermined operational window around each engine cylinder ignition's event and storing a maximum sampled value as said maximum value.

3. The method of claim 1 wherein said step of determining said knock threshold comprises the steps of:

determining a delta knock sensor signal value for said particular cylinder; and adding said average level of background noise and said delta knock sensor signal value.

4. The method of claim 3 wherein said step of determining said average level of background noise comprises the steps of:

interpolating a current noise versus a engine rotational speed if said engine rotational speed is within a predetermined speed range;

calculating a new background noise value based on said interpolated noise value;

interpolating a maximum noise level versus said engine rotational speed;

determining if said new background noise value is greater than said maximum noise level;

interpolating a minimum noise level versus said engine rotational speed if said new background noise value is not greater than said maximum noise level;

determining if said new background noise value is greater than said minimum noise level; and saving said new background noise value said background noise value if said new background noise value is greater than said minimum noise level.

5. The method of claim 3 wherein said delta knock sensor signal value is varies depending upon a position of said particular cylinder within said engine.

6. The method of claim 3 wherein said delta knock sensor signal value is constant for each of said plurality of engine cylinders.

7. In a vehicle having an internal combustion engine, an electronic control module with memory, a plurality of sensors for generating signals in response to various vehicle dynamics, said engine including a plurality of engine cylinders, said electronic control module receiving said signals from said plurality of sensors and controlling said engine in response thereto, said plurality of sensors including a knock sensor and a position sensor, said knock sensor operable for generating a knock sensor signal indicative of a firing condition in each of said plurality of engine cylinders, said position sensor operable for generating a position sensor signal indicative of a rotational position of said engine, a method for controlling knock in said engine comprising the steps:

- sensing a plurality of engine conditions, the plurality of engine conditions including an engine rotational speed, an engine temperature and a manifold absolute pressure;
- determining whether said engine temperature is greater than a predetermined temperature;
- determining a maximum value of said knock sensor signal;
- identifying a particular cylinder which produced said maximum value;
- employing the engine rotational speed and a look-up table having a plurality of predetermined background noise values to determine an average level of background noise transmitted through said engine;
- determining a knock threshold for said particular cylinder, the knock threshold being determined from the average level of background noise and a predetermined amount based on an identity of the particular cylinder that produced the maximum value;
- determining if said maximum value exceeds said knock threshold;
- modifying a spark advance each of the plurality of engine cylinders if said maximum value exceeds said knock threshold, said engine temperature is greater than said predetermined temperature and said manifold absolute pressure is greater than a predetermined manifold absolute pressure; and
- otherwise, retarding said spark advance if said manifold absolute pressure is not less than said predetermined manifold absolute pressure and said engine temperature is greater than said predetermined temperature.

8. The method of claim 7 wherein said step of determining a maximum value comprises sampling said knock sensor signal in a predetermined operational window around each engine cylinder ignition's event and storing a maximum sampled value as said maximum value.

9. The method of claim 7, wherein said step of determining said knock threshold comprises the steps of:

- determining a delta knock sensor signal value for said particular cylinder; and
- adding said average level of background noise and said delta knock sensor signal value.

10. The method of claim 9, wherein said step of determining said average level of background noise comprises the steps of:

- interpolating a current noise versus an engine rotational speed if said engine rotational speed is within a predetermined speed range;
- calculating a new background noise value based on said interpolated noise value;
- interpolating a maximum noise level versus said engine rotational speed;
- determining if said new background noise value is greater than said maximum noise level;
- interpolating a minimum noise level versus said engine rotational speed if said new background noise value is not greater than said maximum noise level;
- determining if said new background noise value is greater than said minimum noise level; and
- saving said new background noise value said background noise value if said new background noise value is greater than said minimum noise level.

11. The method of claim 9, wherein said delta knock sensor signal value varies depending upon a position of said particular cylinder within said engine.

12. The method of claim 9, wherein said delta knock sensor signal value is constant for each of said plurality of engine cylinders.

* * * * *